United States Patent
Satou

(10) Patent No.: US 10,823,441 B2
(45) Date of Patent: Nov. 3, 2020

(54) AIR CONDITIONER CONTROL DEVICE AND AIR CONDITIONER CONTROL METHOD

(71) Applicant: Panasonic Intellectual Property Management Co., Ltd., Osaka (JP)

(72) Inventor: Kaoru Satou, Tokyo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 389 days.

(21) Appl. No.: 15/816,046

(22) Filed: Nov. 17, 2017

(65) Prior Publication Data

US 2018/0202676 A1 Jul. 19, 2018

(30) Foreign Application Priority Data

Jan. 17, 2017 (JP) ................. 2017-005780

(51) Int. Cl.
| | |
|---|---|
| *F24F 11/00* | (2018.01) |
| *G05B 15/02* | (2006.01) |
| *F24F 11/30* | (2018.01) |
| *F24F 11/62* | (2018.01) |
| *F24F 11/83* | (2018.01) |
| *F24F 11/63* | (2018.01) |
| *F24F 110/10* | (2018.01) |
| *F24F 140/50* | (2018.01) |

(52) U.S. Cl.
CPC .............. *F24F 11/30* (2018.01); *F24F 11/62* (2018.01); *F24F 11/83* (2018.01); *G05B 15/02* (2013.01); *F24F 11/63* (2018.01); *F24F 2110/10* (2018.01); *F24F 2140/50* (2018.01); *G05B 2219/2642* (2013.01)

(58) Field of Classification Search
CPC ................. F24F 11/006; F24F 11/0012; F24F 2011/0061; F24F 11/83; F24F 11/62; F24F 11/30; F24F 11/63; F24F 2140/50; F24F 2110/10; G05B 15/02; G05B 2219/2642
See application file for complete search history.

(56) References Cited

U.S. PATENT DOCUMENTS

| | | | | |
|---|---|---|---|---|
| 7,854,138 | B2 * | 12/2010 | Hwang, II | ............ F25B 49/022 62/175 |
| 9,534,797 | B2 * | 1/2017 | Tsutsumi | ............... F24F 3/0442 |
| 9,696,055 | B1 * | 7/2017 | Goodman | .......... G05D 23/1932 |

(Continued)

FOREIGN PATENT DOCUMENTS

| | | | | |
|---|---|---|---|---|
| JP | 2010-156494 | | 7/2010 | |
| JP | 5332236 | * | 11/2013 | ............... F24F 11/89 |
| WO | WO2014162509 | * | 10/2014 | ............... F24F 11/02 |

*Primary Examiner* — Roccio Del Mar Perez-Velez
*Assistant Examiner* — Olvin Lopez Alvarez
(74) *Attorney, Agent, or Firm* — Greenblum & Bernstein, P.L.C.

(57) ABSTRACT

An air conditioner control device includes: a receiver that receives measurement values for ambient temperatures of air conditioners installed inside a facility; and a controller that adjusts setting temperatures for cooling operations (or heating operations) of each of the air conditioners to values that are less (or values that are greater) than the measurement values for each of the air conditioners, when at least one of the measurement values received by the receiver is greater (or less) than a target temperature inside the facility.

18 Claims, 10 Drawing Sheets

(56) References Cited

U.S. PATENT DOCUMENTS

| | | | |
|---|---|---|---|
| 2010/0125370 A1* | 5/2010 | Baba | F24F 11/30 |
| | | | 700/276 |
| 2011/0016893 A1* | 1/2011 | Dawes | G05B 9/03 |
| | | | 62/89 |
| 2011/0098863 A1* | 4/2011 | Miki | G05B 19/409 |
| | | | 700/275 |
| 2011/0257794 A1 | 10/2011 | Nishino et al. | |
| 2012/0174611 A1* | 7/2012 | Yamashita | F24F 3/065 |
| | | | 62/204 |
| 2012/0298347 A1* | 11/2012 | Maeda | F24F 11/62 |
| | | | 165/201 |
| 2012/0312885 A1* | 12/2012 | Tomlinson | F24F 11/76 |
| | | | 237/12 |
| 2015/0276255 A1* | 10/2015 | Honda | F24F 11/83 |
| | | | 62/216 |
| 2016/0178225 A1* | 6/2016 | Vallikannu | F24F 11/62 |
| | | | 700/276 |
| 2016/0245569 A1* | 8/2016 | Unezaki | F25B 13/00 |
| 2016/0252284 A1* | 9/2016 | Kibo | F24F 11/30 |
| | | | 62/115 |
| 2017/0292728 A1* | 10/2017 | Ushirosako | F24F 11/62 |
| 2018/0356115 A1* | 12/2018 | Koizumi | F24F 11/62 |
| 2019/0212027 A1* | 7/2019 | Muramatsu | F24F 11/46 |

* cited by examiner

AIR CONDITIONER CONTROL DEVICE AND AIR CONDITIONER CONTROL METHOD

BACKGROUND

1. Technical Field

The present disclosure relates to an air conditioner control device and an air conditioner control method.

2. Description of the Related Art

Air conditioners for cooling, drying, and heating air and the like are installed in facilities such as stores, business premises, and factories. Ordinarily, the spaces (areas) inside such facilities spread out horizontally compared to the spaces inside a residence, and deviations in temperature and humidity inside the areas also become more prominent. Air conditioners are often installed in order to perform air conditioning inside such areas in a uniform manner.

Generally, the operating efficiency of an air conditioner is decided according to the heat load (air conditioning load) for that air conditioner. In the case where air conditioners are installed, the operating efficiency of the air conditioners as a whole deteriorates when there is a large deviation in the heat load inside an area. Thus, a technique for improving the operating efficiency of air conditioners as a whole has been proposed (see Japanese Unexamined Patent Application Publication No. 2010-156494).

SUMMARY

In the technique of Japanese Unexamined Patent Application Publication No. 2010-156494, a total air conditioning load is calculated, an optimum load processing amount of each air conditioner is decided such that the operating efficiency (COP) for the calculated total air conditioning load becomes the maximum or equal to or greater than a predetermined level, and the air conditioning capacity of each air conditioner is controlled on the basis of the decided optimum load processing amounts.

When controlling the air conditioning capacity of an air conditioner, it is necessary to calculate the operating efficiency of the air conditioner. Here, the operating efficiency of the air conditioner is a value obtained by dividing the air conditioning capacity of the air conditioner by the total amount of power consumed by the air conditioner. In addition, in order to calculate the air conditioning capacity of the air conditioner, it is necessary to derive the enthalpy of an evaporator or a condenser in the air conditioner.

Consequently, there is a problem in that it is necessary to derive or measure data such as the enthalpy and power consumption as well as data such as the thermo on/off state, setting temperature, and suction temperature (ambient temperature) used in existing air conditioners, which incurs a calculation cost and a measurement instrument cost.

One non-limiting and exemplary embodiment provides an air conditioner control device and air conditioner control method with which air conditioners are controlled by way of ambient temperatures and setting temperatures.

In one general aspect, the techniques disclosed here feature an air conditioner control device includes: a receiver that receives measurement values for ambient temperatures of air conditioners installed inside a facility; and a controller that adjusts setting temperatures for cooling operations (or heating operations) of each of the air conditioners to values that are less (or values that are greater) than the measurement values for each of the air conditioners, when at least one of the measurement values received by the receiver is greater (or less) than a target temperature inside the facility.

It should be noted that general or specific aspects hereof may be realized by a system, a method, an integrated circuit, a computer program, or a recording medium such as a computer-readable CD-ROM, and may be realized by an arbitrary combination of a system, a method, an integrated circuit, a computer program, and a recording medium.

According to the present disclosure, it is possible to provide an air conditioner control device, air conditioner control method, or the like with which air conditioners are controlled by way of ambient temperatures and setting temperatures.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Hereinafter, embodiments of the present disclosure will be described in detail with reference to the appended drawings.

Figure 1:
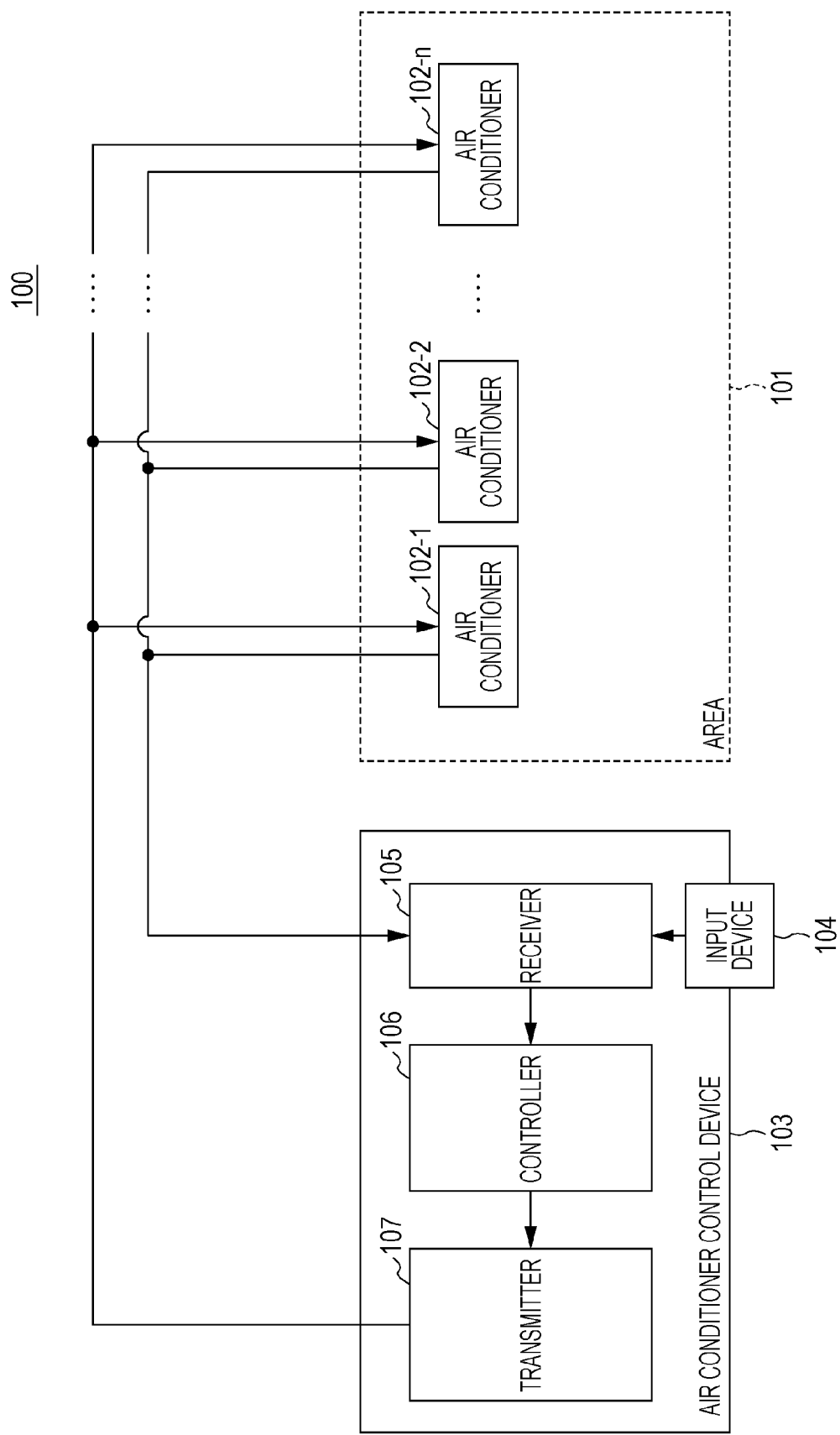
FIG. 1 depicts an example of a configuration of an air conditioning system according to the present disclosure.

FIG. 1 depicts an example of a configuration of an air conditioning system 100 according to the present disclosure. The air conditioning system 100 includes n (n being a positive integer) number of air conditioners 102-1, . . . , 102-n, an air conditioner control device 103, an input device 104, a receiver 105, a controller 106, and a transmitter 107.

In the present disclosure, as an example, a case is described in which the air conditioner control device 103 receives data from air conditioners that perform air conditioning in the same area 101, decides control content with reference to that data, and controls the air conditioners according to that control content. In the present disclosure, air conditioning means at least any one of air conditioning by means of a heating operation and air conditioning by means of a cooling operation. Here, the cooling operation, in a broad sense, also includes a drying operation (a weak cooling-dehumidifying operation) as well as a normal cooling operation. In the description and appended drawings hereinafter, the normal cooling operation and drying operation are not differentiated and are both referred to as a "cooling operation".

The air conditioners 102-1, . . . , 102-$n$ are installed in the area 101. The air conditioners 102-1, . . . , 102-$n$ perform air conditioning with respect to the area 101.

In one example, the air conditioners 102-1, . . . , 102-$n$ include indoor air-conditioning units (not depicted) that blow air and outdoor air-conditioning units (not depicted) that carry out heat exchange. So long as the indoor air-conditioning units are installed inside the area 101 and the outdoor air-conditioning units are installed outside the area 101, the indoor air-conditioning units and the outdoor air-conditioning units may be provided as separate units or may be provided as single units.

Setting temperatures can be set separately for the air conditioners 102-1, . . . , 102-$n$. Here, a setting temperature is a control target value for the ambient temperature of an air conditioner. The air conditioners 102-1, . . . , 102-$n$ each cause the indoor air-conditioning unit and the outdoor air-conditioning unit thereof to operate such that the ambient temperature thereof reaches the setting temperature that has been set therefor.

In the present disclosure, an ambient temperature means the temperature at a point near an air conditioner. A possible example of the ambient temperature is the suction temperature of an air conditioner or the peripheral temperature of an air conditioner, for example. In the description and appended drawings hereinafter, embodiments are described with the suction temperature being taken as an example of the ambient temperature; however, an ambient temperature (peripheral temperature) other than the suction temperature may be applied as the ambient temperature. For example, the ambient temperature may be the temperature of air within 1 m of the periphery of an air conditioner.

The air conditioner control device 103 is a computer having an arithmetic unit such as a central processing unit (CPU) and storage devices such as a read-only memory (ROM) and a random-access memory (RAM). The CPU reads a program corresponding to processing content from the ROM, for example, decompresses the program in the RAM, and performs centralized control with respect to the input device 104, the receiver 105, the controller 106, and the transmitter 107 provided in the air conditioner control device 103, in cooperation with the decompressed program.

The input device 104 receives the input of a target temperature. Here, the target temperature is a temperature inside the area 101 that is to serve as a target. In one example, the input device 104 includes a user interface such as a numeric keypad or a touch panel. In another example, the input device 104 is an input device that receives a signal received from an externally connected energy management system (for example, a controller).

The receiver 105 receives the target temperature from the input device 104. In addition, the receiver 105 receives operation data of the air conditioners 102-1, . . . , 102-$n$ installed inside the facility. In one example, the receiver 105 repeats these operations at each fixed period.

The operation data is at least one of measurement values for suction temperature, operation modes, and thermo on/off states. Here, an operation mode means a cooling operation mode or a heating operation mode. Furthermore, a thermo-on state means a state in which a temperature adjustment function is operating. Furthermore, a thermo-off state means a state in which the temperature adjustment function is not functioning, such as an air blowing state.

The controller 106 decides content (setting content) to be set for the air conditioners 102-1, . . . , 102-$n$, using the target temperature and the operation data received by the receiver 105.

In the case where the air conditioners 102-1, . . . , 102-$n$ carry out cooling operations (or heating operations), the controller 106 determines whether or not at least one measurement value for suction temperature received by the receiver 105 is greater (or less) than the target temperature inside the facility. Next, when having determined that at least one measurement value for suction temperature is greater (or less) than the target temperature, the controller 106 decides the setting content such that the setting temperatures in the cooling operations (or the heating operations) for each of the air conditioners 102-1, . . . , 102-$n$ are adjusted to values that are less (or values that are greater) than the measurement values for suction temperature for each of the air conditioners 102-1, . . . , 102-$n$.

In one example, the controller 106 adjusts the setting temperatures to values that are less (or values that are greater) than the measurement values for suction temperature for each of the air conditioners 102-1, . . . , 102-$n$, the setting temperatures for the cooling operations (or the heating operations) of the air conditioners for which the measurement values for suction temperature are greater (or less) than the target temperature being adjusted to be lower (or higher) than the setting temperatures for the cooling operations (or the heating operations) of the air conditioners for which the measurement values for suction temperature are less (or greater) than the target temperature.

In one example, the controller 106 adjusts the setting temperatures for the cooling operations (or the heating operations) of each of the air conditioners 102-1, . . . , 102-$n$ to values that are greater (or values that are less) than the measurement values for suction temperature, when the measurement values for suction temperature for each of the air conditioners 102-1, . . . , 102-$n$ during the cooling operations (or the heating operations) are all less (or greater) than the target temperature.

The controller 106 outputs the setting content to the transmitter 107. In one example, the controller 106 repeats these operations at each fixed period.

The transmitter 107, at each fixed period, implements settings for the air conditioners 102-1, . . . , 102-$n$ in accordance with the setting content decided by the controller 106. The setting content includes setting temperatures for each of the air conditioners 102-1, . . . , 102-$n$, for example.

First Embodiment

Next, an operation of the controller 106 according to a first embodiment of the present disclosure will be described.

Figure 2:
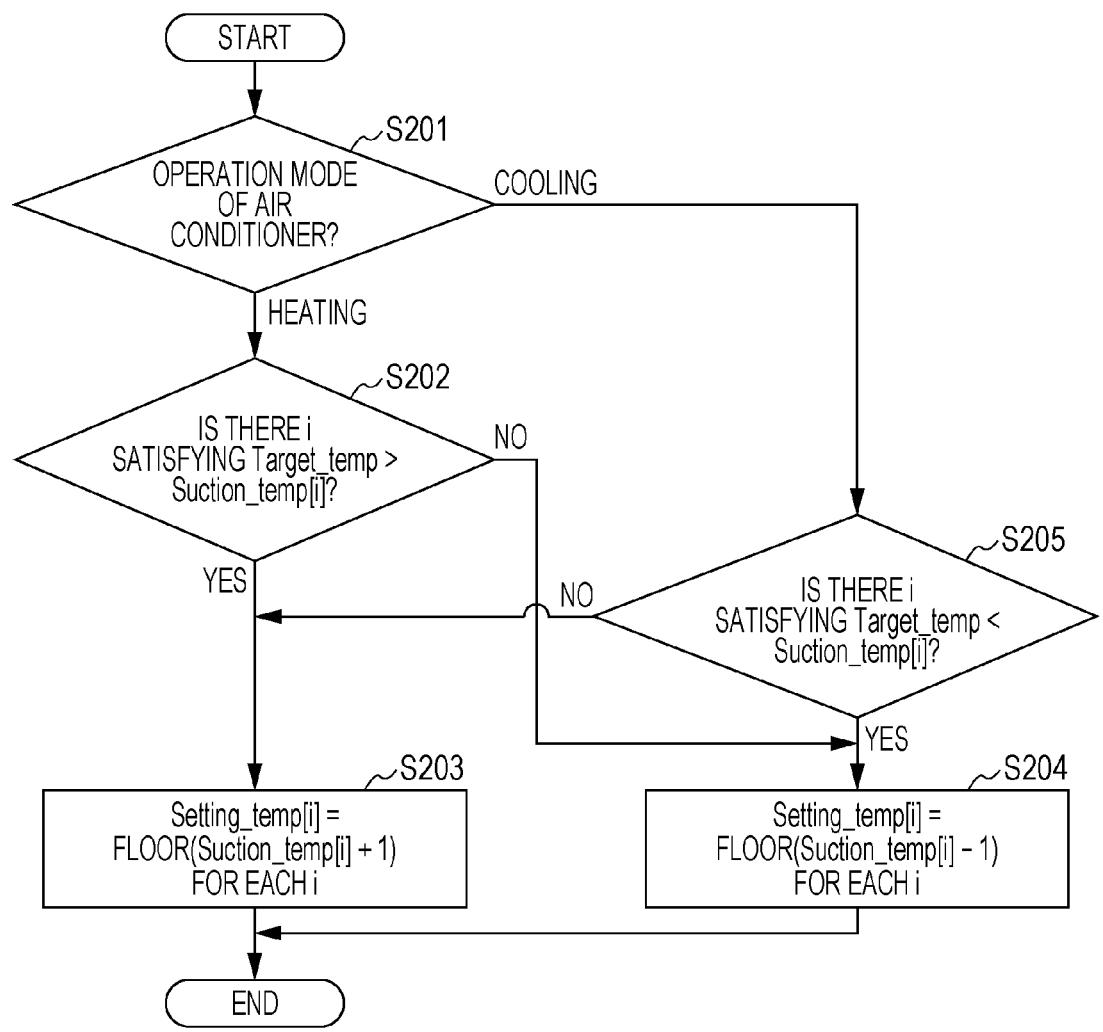
FIG. 2 is a flowchart depicting an operation of a controller according to a first embodiment.

FIG. 2 is a flowchart depicting an operation of the controller 106 according to the first embodiment. Here, as an example, a case is described in which the controller 106 decides, as setting content, the setting temperatures (Setting_temp[i] ($1 \leq i \leq n$)) to be set for the air conditioners 102-1, . . . , 102-$n$, using the target temperature (Target_temp) and the suction temperatures (Suction_temp[i] ($1 \leq i \leq n$)) and operation modes of the air conditioners 102-1, . . . , 102-$n$ received by the receiver 105, and outputs the setting content to the transmitter 107.

First, in step S201, the controller 106 determines the operation modes of the air conditioners 102-1, . . . , 102-$n$. In one example, the controller 106 proceeds to step S202 in the case where the number of air conditioners carrying out the heating operations is greater than the number of air conditioners carrying out the cooling operations from among the air conditioners 102-1, . . . , 102-n on the basis of the operation modes received by the receiver 105, and proceeds to step S205 if that is not the case.

In the case where the operation of the controller 106 has proceeded to step S202, in step S202, the controller 106 carries out a determination relating to the target temperature and the suction temperatures. In one example, a comparison is carried out between the suction temperatures Suction_temp[i] (1≤i≤n) of all of the air conditioners and the target temperature Target_temp, the operation proceeds to step S203 in the case where there is i satisfying Target_temp>Suction_temp[i], and the operation proceeds to step S204 in the case where there is no i satisfying Target_temp>Suction_temp[i].

In the case where the operation of the controller 106 has proceeded to step S203, in step S203, the controller 106 decides the setting temperatures to be set for all of the air conditioners 102-1, . . . , 102-n, and outputs the decided setting temperatures as setting content to the transmitter 107.

In one example, the controller 106 decides the setting temperatures Setting_temp[i] (1≤i≤n) using numerical expression (1) below, and the decided setting temperatures Setting_temp[i] (1≤i≤n) are output as setting content to the transmitter 107.

$$\text{Setting\_temp}[i] = \text{FLOOR}(\text{Suction\_temp}[i]+1) \quad (1)$$

Here, FLOOR(x) is a floor function that returns the largest integer that does not exceed x.

In another example, the controller 106 adjusts the setting temperatures Setting_temp[i] for the heating operations (or the cooling operations) of air conditioners in which the suction temperatures Suction_temp[i] are less (or greater) than the target temperature Target_temp, to be the target temperature Target_temp. Meanwhile, the controller 106 adjusts the setting temperatures Setting_temp[i] for the heating operations (or the cooling operations) of air conditioners in which the suction temperatures Suction_temp[i] are greater (or less) than the target temperature Target_temp, to be values that are greater (or values that are less) than the respective suction temperatures Suction_temp[i]. For example, in the case where the operation mode is the heating operation and Target_temp>FLOOR(Suction_temp[i]+1) is established, the target temperature may be decided as the setting temperatures using the following numerical expression (1') instead of numerical expression (1).

$$\text{Setting\_temp}[i] = \text{Target\_temp} \quad (1')$$

Meanwhile, in the case where the operation of the controller 106 has proceeded to step S204, in step S204, the controller 106 decides the setting temperatures to be set for all of the air conditioners 102-1, . . . , 102-n, and outputs the decided setting temperatures as setting content to the transmitter 107.

In one example, the setting temperatures Setting_temp[i] (1≤i≤n) are decided using numerical expression (2) below, and the decided setting temperatures Setting_temp[i] (1≤i≤n) are output as setting content to the transmitter 107.

$$\text{Setting\_temp}[i] = \text{FLOOR}(\text{Suction\_temp}[i]-1) \quad (2)$$

In another example, in the case where the operation mode is the cooling operation and Target_temp<FLOOR(Suction_temp[i]-1) is established, the target temperature may be decided as the setting temperatures using the following numerical expression (2') instead of numerical expression (2).

$$\text{Setting\_temp}[i] = \text{Target\_temp} \quad (2')$$

Meanwhile, in the case where the operation of the controller 106 has proceeded to step S205, in step S205, the controller 106 carries out a determination relating to the target temperature and the suction temperatures. In one example, a comparison is carried out between the suction temperatures Suction_temp[i] (1≤i≤n) of all of the air conditioners and the target temperature Target_temp, the operation proceeds to step S204 in the case where there is i satisfying Target_temp<Suction_temp[i], and the operation proceeds to step S203 in the case where there is no i satisfying Target_temp<Suction_temp[i].

It is preferable that the controller 106 carry out the operation depicted in the flowchart of FIG. 2 at each fixed period. Each fixed period is 5 to 10 minutes, for example.

Next, the way in which energy is conserved according to the first embodiment will be described giving an example.

Figure 3:
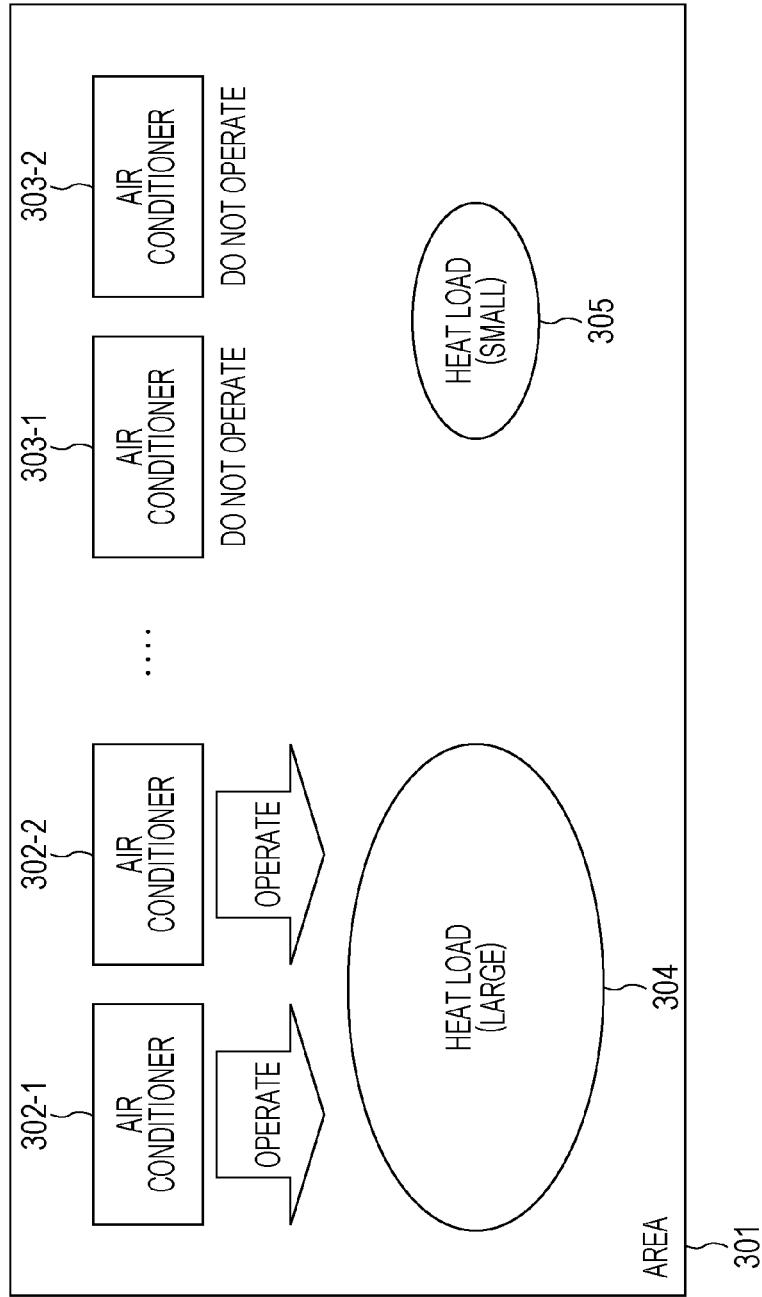
FIG. 3 is a drawing depicting an example of air conditioner operating states.

FIG. 3 is a drawing depicting an example of air conditioner operating states. Air conditioners 302-1, 302-2, . . . , 303-1, 303-2 are installed in one area 301.

The air conditioners 302-1 and 302-2 are near a heat load 304, and the air conditioners 303-1 and 303-2 are near a heat load 305. Here, the heat load 304 and the heat load 305 schematically represent a deviation in heat loads inside the area 301.

The heat load 304 is a comparatively large heat load, and therefore the air conditioners 302-1 and 302-2 near the heat load 304 actively operate and process the heat load. However, the heat load 305 is a comparatively small heat load, and therefore the air conditioners 303-1 and 303-2 near the heat load 305 do not operate and do not process the heat load.

As depicted in FIG. 3, in an environment in which the air conditioners 302-1, 302-2, . . . , 303-1, 303-2 are installed in the one area 301, due to the deviation in the temperature distribution inside the area 301, a state may occur in which only some of the air conditioners 302-1 and 302-2 actively operate and process a large amount of the heat load inside the area 301, whereas the other air conditioners 303-1 and 303-2 either do not operate at all or hardly operate.

In an operating state such as this, the following is feasible from the viewpoint of the operating efficiency of each of the air conditioners 302-1, 302-2, . . . , 303-1, 303-2.

Figure 4:
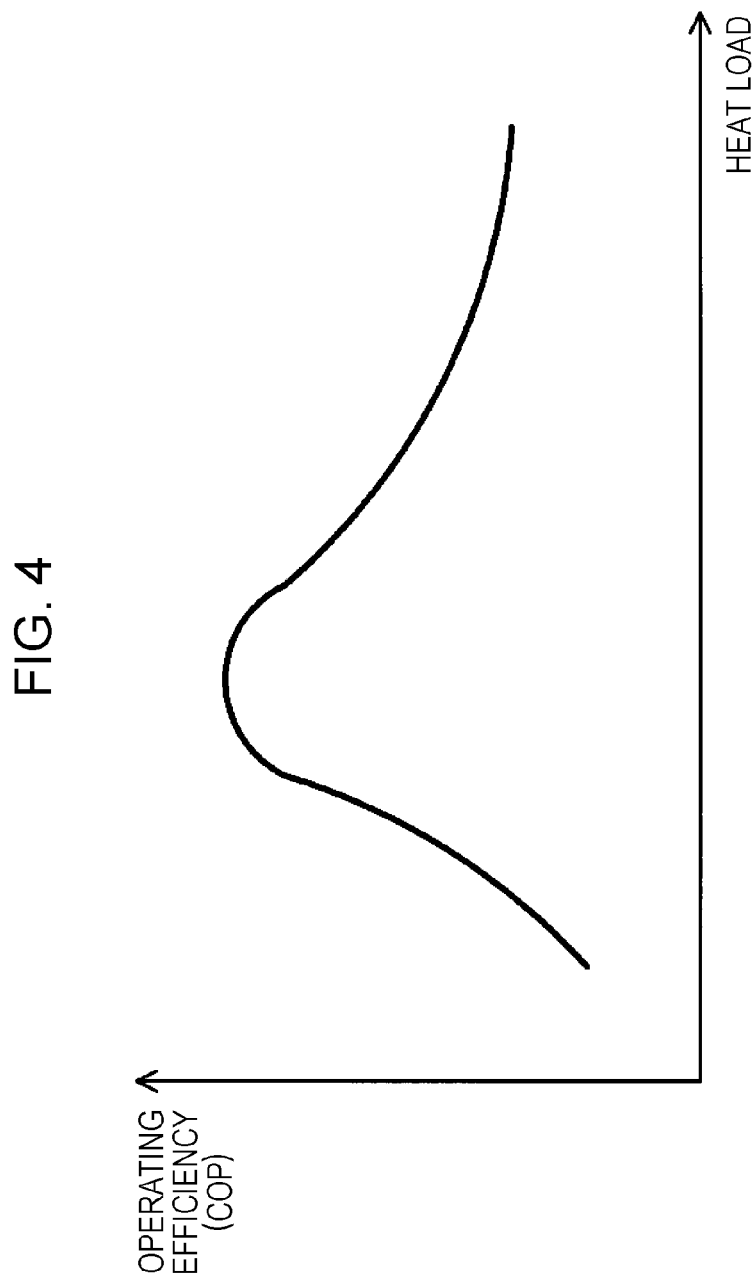
FIG. 4 is a drawing depicting a general efficiency curve of an air conditioner.

FIG. 4 is a drawing depicting a general efficiency curve of an air conditioner. As depicted in FIG. 4, the efficiency curve of an air conditioner has a peak-like shape. The operating efficiency is at its best when processing an intermediate heat load corresponding to the apex of the peak. However, the operating efficiency of an air conditioner deteriorates when the heat load is too little or too large, and power consumption increases.

Ordinarily, in an area of a facility such as a store, an office, or a factory in which air conditioners are employed, air conditioners having a suitable horsepower are selected such that optimum efficiency is achieved in the case where the heat load inside the area is shared equally by all of the air conditioners and all of the air conditioners are operating in a uniform manner. However, in a state in which only some of the air conditioners 302-1 and 302-2 mainly operate and process a large amount of the heat load as in the example depicted in FIG. 3, the operating efficiency of the air conditioners 302-1 and 302-2 that are operating drops and deteriorates at the right side of the peak of the efficiency curve depicted in FIG. 4.

A deterioration in operating efficiency such as the aforementioned can be avoided by means of the operation of the controller 106 previously mentioned with reference to FIG. 2. In other words, all of the air conditioners are caused to operate in the case where it is determined that a state has been entered in which only some out of all to the air conditioners 102-1, . . . , 102-n are operating. Furthermore, by causing all of the air conditioners 102-1, . . . , 102-n to not operate in the case where it is determined that it is not necessary for the air conditioners to operate, an operation state corresponding to a high position on the peak of the operating efficiency depicted in FIG. 4 can be maintained, and a deterioration in operating efficiency can be avoided.

The aforementioned operation of the controller 106 becomes an operation in which the temperatures inside the area are made to converge on the target temperature by switching between operation/non-operation of all of the air conditioners 102-1, . . . , 102-n.

In this way, according to the first embodiment, the operating efficiency (COP) of all of the air conditioners 102-1, . . . , 102-n can be improved by setting the setting temperatures of the air conditioners 102-1, . . . , 102-n using the target temperature that is input by way of the input device 104, the suction temperatures measured by the air conditioners 102-1, . . . , 102-n, and the operation modes of the air conditioners 102-1, . . . , 102-n.

The operation data used by the air conditioner control device 103 is constituted by only the suction temperatures and operation modes of the air conditioners 102-1, . . . , 102-n. In addition, the content by which the air conditioner control device 103 controls the air conditioners 102-1, . . . , 102-n is also constituted by only the setting of the setting temperatures. In this way, according to the first embodiment, only operation data and setting items that are within the framework of known air conditioners are used, and it is therefore not necessary for costs such as the addition of new functions to the air conditioners to be incurred, and an improvement in operating efficiency can be easily achieved.

Furthermore, according to the first embodiment, all of the air conditioners 102-1, . . . , 102-n either operate in a uniform manner or do not operate, and therefore an improvement in operating efficiency can be achieved.

Second Embodiment

Next, an operation of the controller 106 according to a second embodiment will be described. In the second embodiment, the controller 106 changes the setting temperatures for the cooling operations (or the heating operations) of the air conditioners not carrying out the cooling operations (or the heating operations) to values that are less (or values that are greater) than the measurement values for suction temperature, without changing the setting temperatures for the cooling operations (or heating the operation) of the air conditioners carrying out the cooling operations (or heating the operation), from among the air conditioners 102-1, . . . , 102-n.

Here, the second embodiment is described taking, as an example, a case in which the controller 106 decides, as setting content, the setting temperatures (Setting_temp[i] ($1 \le i \le n$)) to be set for the air conditioners 102-1, . . . , 102-n, using the target temperature (Target_temp) and the suction temperatures (Suction_temp[i] ($1 \le i \le n$)), the operation modes, and the thermo on/off states (Thermo_onoff[i] ($1 \le i \le n$)) of the air conditioners 102-1, . . . , 102-n received by the receiver 105.

Figure 5:
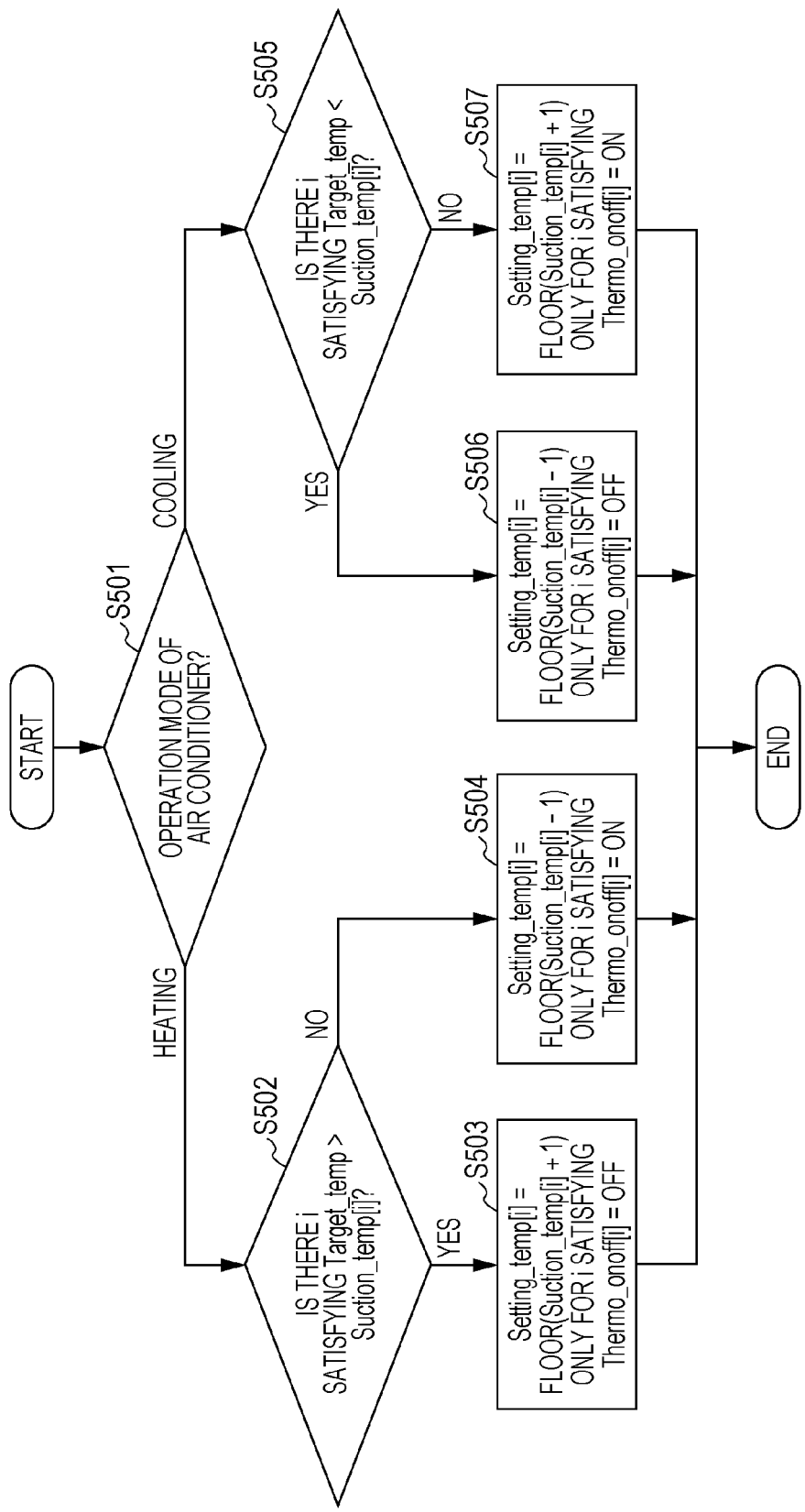
FIG. 5 is a flowchart depicting an operation of the controller according to a second embodiment.

FIG. 5 is a flowchart depicting an operation of the controller 106 according to the second embodiment. First, in step S501, the controller 106 determines the operation modes of the air conditioners 102-1, . . . , 102-n. In one example, the controller 106 proceeds to step S502 in the case where the number of air conditioners carrying out the heating operations is greater than the number of air conditioners carrying out the cooling operations from among the air conditioners 102-1, . . . , 102-n on the basis of the operation modes received by the receiver 105, and proceeds to step S505 if that is not the case.

In the case where the operation of the controller 106 has proceeded to step S502, in step S502, the controller 106 carries out a determination relating to the target temperature and the suction temperatures. In one example, a comparison is carried out between the suction temperatures Suction_temp[i] ($1 \le i \le n$) of all of the air conditioners and the target temperature Target_temp, the operation proceeds to step S503 in the case where there is i satisfying Target_temp>Suction_temp[i], and the operation proceeds to step S504 in the case where there is no i satisfying Target_temp>Suction_temp[i].

In the case where the operation of the controller 106 has proceeded to step S503, in step S503, the controller 106 decides the setting temperatures to be set for all of the air conditioners 102-1, . . . , 102-n, and outputs the decided setting temperatures as setting content to the transmitter 107.

In one example, the setting temperatures Setting_temp[i] ($1 \le i \le n$) are decided using the aforementioned numerical expression (1) only for air conditioners in which the value of the thermo on/off state Thermo_onoff[i] ($1 \le i \le n$) is thermo off (Thermo_onoff[i]=OFF) from among all of the air conditioners 102-1, . . . , 102-n, and the decided setting temperatures Setting_temp[i] ($1 \le i \le n$) are output as setting content to the transmitter 107.

In another example, in the case where Target_temp>FLOOR(Suction_temp[i]+1) is established, the target temperature may be decided as the setting temperatures using numerical expression (1') instead of numerical expression (1).

Meanwhile, in the case where the operation of the controller 106 has proceeded to step S504, in step S504, the controller 106 decides the setting temperatures to be set for all of the air conditioners 102-1, . . . , 102-n, and outputs the decided setting temperatures as setting content to the transmitter 107.

In one example, the setting temperatures Setting_temp[i] ($1 \le i \le n$) are decided using the aforementioned numerical expression (2) only for air conditioners in which the value of the thermo on/off state Thermo_onoff[i] ($1 \le i \le n$) is thermo on (Thermo_onoff[i]=ON) from among all of the air conditioners 102-1, . . . , 102-n, and the decided setting temperatures Setting_temp[i] ($1 \le i \le n$) are output as setting content to the transmitter 107.

Meanwhile, in the case where the operation of the controller 106 has proceeded to step S505, in step S505, the controller 106 carries out a determination relating to the target temperature and the suction temperatures. In one example, a comparison is carried out between the suction temperatures Suction_temp[i] ($1 \le i \le n$) of all of the air conditioners and the target temperature Target_temp, the operation proceeds to step S506 in the case where there is i satisfying Target_temp<Suction_temp[i], and the operation proceeds to step S507 in the case where there is no i satisfying Target_temp<Suction_temp[i].

In the case where the operation of the controller 106 has proceeded to step S506, in step S506, the controller 106 decides the setting temperatures to be set for all of the air conditioners 102-1, . . . , 102-n, and outputs the decided setting temperatures as setting content to the transmitter 107.

In one example, the setting temperatures Setting_temp[i] (1≤i≤n) are decided using the aforementioned numerical expression (2) only for air conditioners in which the value of the thermo on/off state Thermo_onoff[i] (1≤i≤n) is thermo off (Thermo_onoff[i]=OFF) from among all of the air conditioners 102-1, . . . , 102-n, and the decided setting temperatures Setting_temp[i] (1≤i≤n) are output as setting content to the transmitter 107.

In another example, in the case where Target_temp<FLOOR(Suction_temp[i]−1) is established, the target temperature may be decided as the setting temperatures using numerical expression (2') instead of numerical expression (2).

Meanwhile, in the case where the operation of the controller 106 has proceeded to step S507, in step S507, the controller 106 decides the setting temperatures to be set for all of the air conditioners 102-1, . . . , 102-n, and outputs the decided setting temperatures as setting content to the transmitter 107.

In one example, the setting temperatures Setting_temp[i] (1≤i≤n) are decided using the aforementioned numerical expression (1) only for air conditioners in which the value of the thermo on/off state Thermo_onoff[i] (1≤i≤n) is thermo on (Thermo_onoff[i]=ON) from among all of the air conditioners 102-1, . . . , 102-n, and the decided setting temperatures Setting_temp[i] (1≤i≤n) are output as setting content to the transmitter 107.

It is preferable that the controller 106 carry out the operation depicted in the flowchart of FIG. 5 at each fixed period. Each fixed period is 5 to 10 minutes, for example.

In this way, according to the second embodiment, the operating efficiency (COP) of all of the air conditioners 102-1, . . . , 102-n can be improved by setting the setting temperatures of the air conditioners 102-1, . . . , 102-n using the target temperature that is input by way of the input device 104, the suction temperatures measured by the air conditioners 102-1, . . . , 102-n, and the operation modes and the thermo on/off states of the air conditioners 102-1, . . . , 102-n.

The operation data used by the air conditioner control device 103 is constituted by only the suction temperatures, the operation modes, and the thermo on/off states of the air conditioners 102-1, . . . , 102-n. In addition, the content by which the air conditioner control device 103 controls the air conditioners 102-1, . . . , 102-n is also constituted by only the setting of the setting temperatures. In this way, according to the second embodiment, only operation data and setting items that are within the framework of known air conditioners are used, and it is therefore not necessary for costs such as the addition of new functions to the air conditioners to be incurred, and an improvement in operating efficiency can be easily achieved.

Furthermore, according to the second embodiment, by referring to the thermo on/off states of the air conditioners 102-1, . . . , 102-n, it is possible for only the air conditioners requiring reversal of the thermo on/off state to be targeted for a setting temperature change from among the air conditioners 102-1, . . . , 102-n.

Third Embodiment

Next, an operation of the controller 106 according to a third embodiment of the present disclosure will be described. In the third embodiment, the controller 106 causes all of the air conditioners 102-1, . . . , 102-n to execute the cooling operations (or the heating operations) when the average value for the measurement values for suction temperature for each of the air conditioners 102-1, . . . , 102-n during the cooling operations (or the heating operations) is greater (or less) than the target temperature by a predetermined value or more.

In addition, in one example, the controller 106 causes all of the air conditioners 102-1, . . . , 102-n to stop the cooling operations (or the heating operations) when the average value for the measurement values for suction temperature for each of the air conditioners 102-1, . . . , 102-n during the cooling operations (or the heating operations) is less (or greater) than the target temperature by a predetermined value or more.

Here, the third embodiment is described taking, as an example, a case in which the controller 106 decides, as setting content, the setting temperatures (Setting_temp[i] (1≤i≤n)) to be set for the air conditioners 102-1, . . . , 102-n, using the target temperature (Target_temp) and the suction temperatures (Suction_temp[i] (1≤i≤n)), the operation modes, and the thermo on/off states (Thermo_onoff[i] (1≤i≤n)) of the air conditioners 102-1, . . . , 102-n received by the receiver 105.

Figure 6:
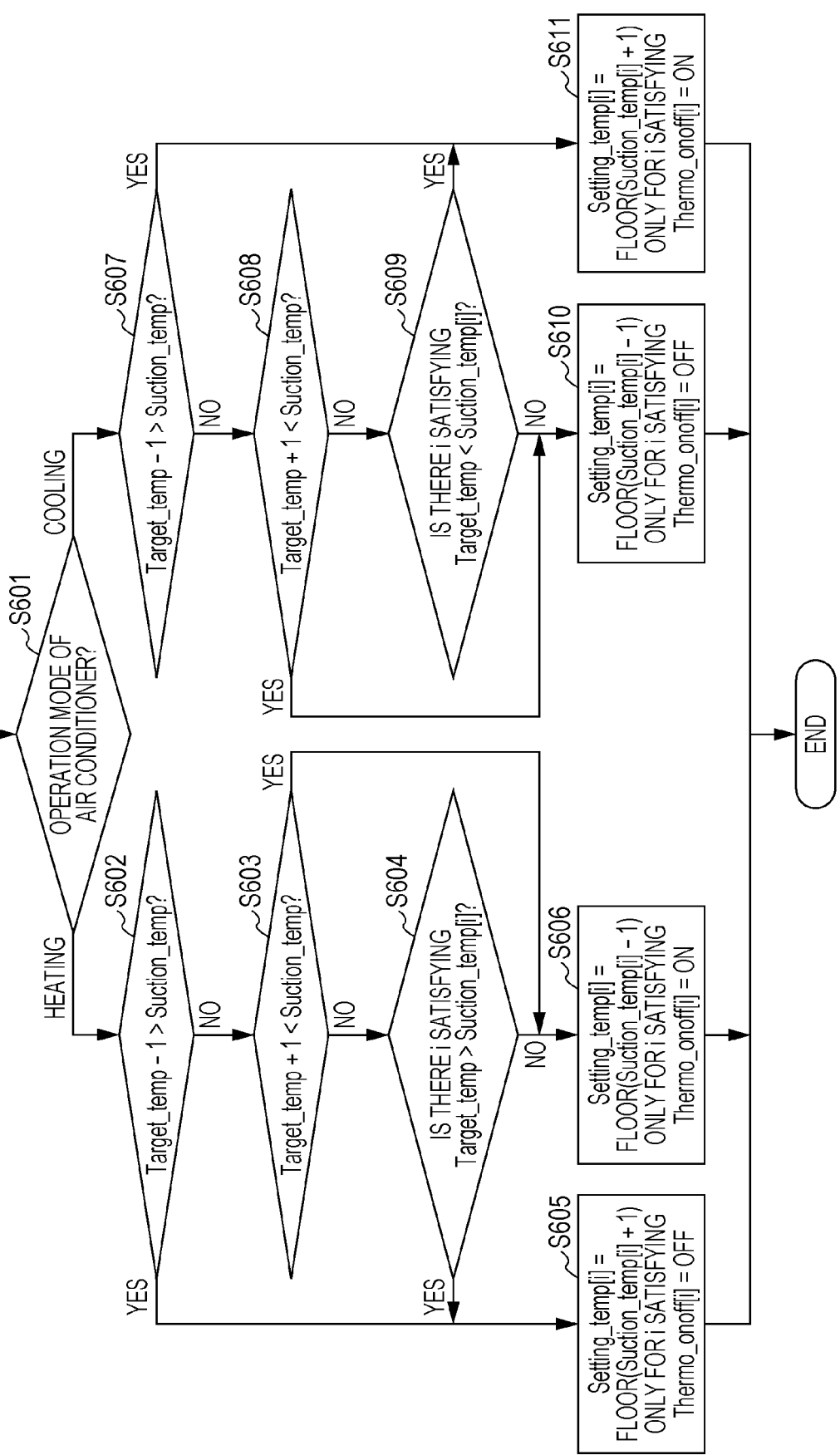
FIG. 6 is a flowchart depicting an operation of the controller according to a third embodiment.

FIG. 6 is a flowchart depicting an operation of the controller 106 according to the third embodiment. First, in step S601, the controller 106 determines the operation modes of the air conditioners 102-1, . . . , 102-n. In one example, the controller 106 proceeds to step S602 in the case where the number of air conditioners carrying out the heating operations is greater than the number of air conditioners carrying out the cooling operations from among the air conditioners 102-1, . . . , 102-n on the basis of the operation modes received by the receiver 105, and proceeds to step S607 if that is not the case.

In the case where the operation of the controller 106 has proceeded to step S602, in step S602, the controller 106 carries out a determination relating to the target temperature and the average suction temperature value. In one example, the controller 106 obtains the average suction temperature value Suction_ave in accordance with the following numerical expression (3) using the suction temperatures Suction_temp[i] (1≤i≤n) of all of the air conditioners.

$$\text{Suction\_ave} = \frac{1}{n} \times \sum_{i=1}^{n} \text{Suction\_temp}[i] \qquad (3)$$

Next, the controller 106 carries out a comparison between the average suction temperature value Suction_ave and the target temperature Target_temp. In the case where Target_temp−1>Suction_ave is satisfied, the operation proceeds to step S605. However, in the case where Target_temp−1>Suction_ave is not satisfied, the operation proceeds to step S603.

In the case where the operation of the controller 106 has proceeded to step S603, in step S603, the controller 106 carries out a determination relating to the target temperature and the average suction temperature value. In one example, the controller 106 carries out a comparison between the average suction temperature value Suction_ave and the target temperature Target_temp. In the case where Target_temp+1<Suction_ave is satisfied, the operation proceeds to step S606. However, in the case where Target_temp+1<Suction_ave is not satisfied, the operation proceeds to step S604.

In the case where the operation of the controller 106 has proceeded to step S604, in step S604, the controller 106 carries out a determination relating to the target temperature and the suction temperatures. In one example, a comparison is carried out between the suction temperatures Suction_temp[i] ($1 \le i \le n$) of all of the air conditioners and the target temperature Target_temp, the operation proceeds to step S605 in the case where there is i satisfying Target_temp>Suction_temp[i], and the operation proceeds to step S606 in the case where there is no i satisfying Target_temp>Suction_temp[i].

In the case where the operation of the controller 106 has proceeded to step S605, in step S605, the controller 106 decides the setting temperatures to be set for all of the air conditioners 102-1, . . . , 102-n, and outputs the decided setting temperatures as setting content to the transmitter 107.

In one example, the setting temperatures Setting_temp[i] ($1 \le i \le n$) are decided using the aforementioned numerical expression (1) only for air conditioners in which the value of the thermo on/off state Thermo_onoff[i] ($1 \le i \le n$) is thermo off (Thermo_onoff[i]=OFF) from among all of the air conditioners 102-1, . . . , 102-n, and the decided setting temperatures Setting_temp[i] ($1 \le i \le n$) are output as setting content to the transmitter 107.

In another example, in the case where Target_temp>FLOOR(Suction_temp[i]+1) is established, the target temperature may be decided as the setting temperatures using numerical expression (1') instead of numerical expression (1).

Meanwhile, in the case where the operation of the controller 106 has proceeded to step S606, in step S606, the controller 106 decides the setting temperatures to be set for all of the air conditioners 102-1, . . . , 102-n, and outputs the decided setting temperatures as setting content to the transmitter 107.

In one example, the setting temperatures Setting_temp[i] ($1 \le i \le n$) are decided using the aforementioned numerical expression (2) only for air conditioners in which the value of the thermo on/off state Thermo_onoff[i] ($1 \le i \le n$) is thermo on (Thermo_onoff[i]=ON) from among all of the air conditioners 102-1, . . . , 102-n, and the decided setting temperatures Setting_temp[i] ($1 \le i \le n$) are output as setting content to the transmitter 107.

Meanwhile, in the case where the operation of the controller 106 has proceeded to step S607, in step S607, the controller 106 carries out a determination relating to the target temperature and the average suction temperature value. In one example, the controller 106 obtains the average suction temperature value Suction_ave in accordance with the aforementioned numerical expression (3) using the suction temperatures Suction_temp[i] ($1 \le i \le n$) of all of the air conditioners.

Next, the controller 106 carries out a comparison between the average suction temperature value Suction_ave and the target temperature Target_temp. In the case where Target_temp−1>Suction_ave is satisfied, the operation proceeds to step S611. However, in the case where Target_temp−1>Suction_ave is not satisfied, the operation proceeds to step S608.

In the case where the operation of the controller 106 has proceeded to step S608, in step S608, the controller 106 carries out a comparison between the average suction temperature value Suction_ave and the target temperature Target_temp. In the case where Target_temp+1<Suction_ave is satisfied, the operation proceeds to step S610. However, in the case where Target_temp+1<Suction_ave is not satisfied, the operation proceeds to step S609.

In the case where the operation of the controller 106 has proceeded to step S609, in step S609, the controller 106 carries out a determination relating to the target temperature and the suction temperatures. In one example, a comparison is carried out between the suction temperatures Suction_temp[i] ($1 \le i \le n$) of all of the air conditioners and the target temperature Target_temp, the operation proceeds to step S611 in the case where there is i satisfying Target_temp<Suction_temp[i], and the operation proceeds to step S610 in the case where there is no i satisfying Target_temp<Suction_temp[i].

In the case where the operation of the controller 106 has proceeded to step S610, in step S610, the controller 106 decides the setting temperatures to be set for all of the air conditioners 102-1, . . . , 102-n, and outputs the decided setting temperatures as setting content to the transmitter 107.

In one example, the setting temperatures Setting_temp[i] ($1 \le i \le n$) are decided using the aforementioned numerical expression (2) only for air conditioners in which the value of the thermo on/off state Thermo_onoff[i] ($1 \le i \le n$) is thermo off (Thermo_onoff[i]=OFF) from among all of the air conditioners 102-1, . . . , 102-n, and the decided setting temperatures Setting_temp[i] ($1 \le i \le n$) are output as setting content to the transmitter 107.

In another example, in the case where Target_temp<FLOOR(Suction_temp[i]−1) is established, the target temperature may be decided as the setting temperatures using numerical expression (2') instead of numerical expression (2).

Meanwhile, in the case where the operation of the controller 106 has proceeded to step S611, in step S611, the controller 106 decides the setting temperatures to be set for all of the air conditioners 102-1, . . . , 102-n, and outputs the decided setting temperatures as setting content to the transmitter 107.

In one example, the setting temperatures Setting_temp[i] ($1 \le i \le n$) are decided using the aforementioned numerical expression (1) only for air conditioners in which the value of the thermo on/off state Thermo_onoff[i] ($1 \le i \le n$) is thermo on (Thermo_onoff[i]=ON) from among all of the air conditioners 102-1, . . . , 102-n, and the decided setting temperatures Setting_temp[i] ($1 \le i \le n$) are output as setting content to the transmitter 107.

It is preferable that the controller 106 carry out the operation depicted in the flowchart of FIG. 6 at each fixed period. Each fixed period is 5 to 10 minutes, for example.

In this way, according to the third embodiment, the operating efficiency (COP) of all of the air conditioners 102-1, . . . , 102-n can be improved by setting the setting temperatures of the air conditioners 102-1, . . . , 102-n using the target temperature that is input by way of the input device 104, the suction temperatures measured by the air conditioners 102-1, . . . , 102-n, and the operation modes and the thermo on/off states of the air conditioners 102-1, . . . , 102-n.

The operation data used by the air conditioner control device 103 is constituted by only the suction temperatures, the operation modes, and the thermo on/off states of the air conditioners 102-1, . . . , 102-n. In addition, the content by which the air conditioner control device 103 controls the air conditioners 102-1, . . . , 102-n is also constituted by only the setting of the setting temperatures. In this way, according to the third embodiment, only operation data and setting items that are within the framework of known air conditioners are used, and it is therefore not necessary for costs such as the addition of new functions to be incurred, and an improvement in operating efficiency can be easily achieved.

Furthermore, according to the third embodiment, the controller 106 determines whether or not the average suction temperature value has diverged greatly compared to the target temperature, by referring to the average suction temperature value of the air conditioners 102-1, . . . , 102-$n$. In the case where it is determined that the average suction temperature value has diverged greatly, the controller 106 can perform control such that the temperature inside the area does not differ greatly from the target temperature, by forcibly causing all of the air conditioners 102-1, . . . , 102-$n$ to operate or not operate.

Fourth Embodiment

Next, an operation of the controller 106 according to a fourth embodiment of the present disclosure will be described. In the fourth embodiment, the controller 106 adjusts, in stages, the setting temperatures of the air conditioners 102-1, . . . , 102-$n$ in the cooling operations (or the heating operations) to values that are less (or values that are greater) than the suction temperatures of each of the air conditioners 102-1, . . . , 102-$n$.

Here, the fourth embodiment is described taking, as an example, a case in which the controller 106 decides, as setting content, the setting temperatures (Setting_temp[i] (1≤i≤n)) to be set for the air conditioners 102-1, . . . , 102-$n$, using the target temperature (Target_temp) and the suction temperatures (Suction_temp[i] (1≤i≤n)), the operation modes, and the thermo on/off states (Thermo_onoff[i] (1≤i≤n)) of the air conditioners 102-1, . . . , 102-$n$ received by the receiver 105.

Figure 7:
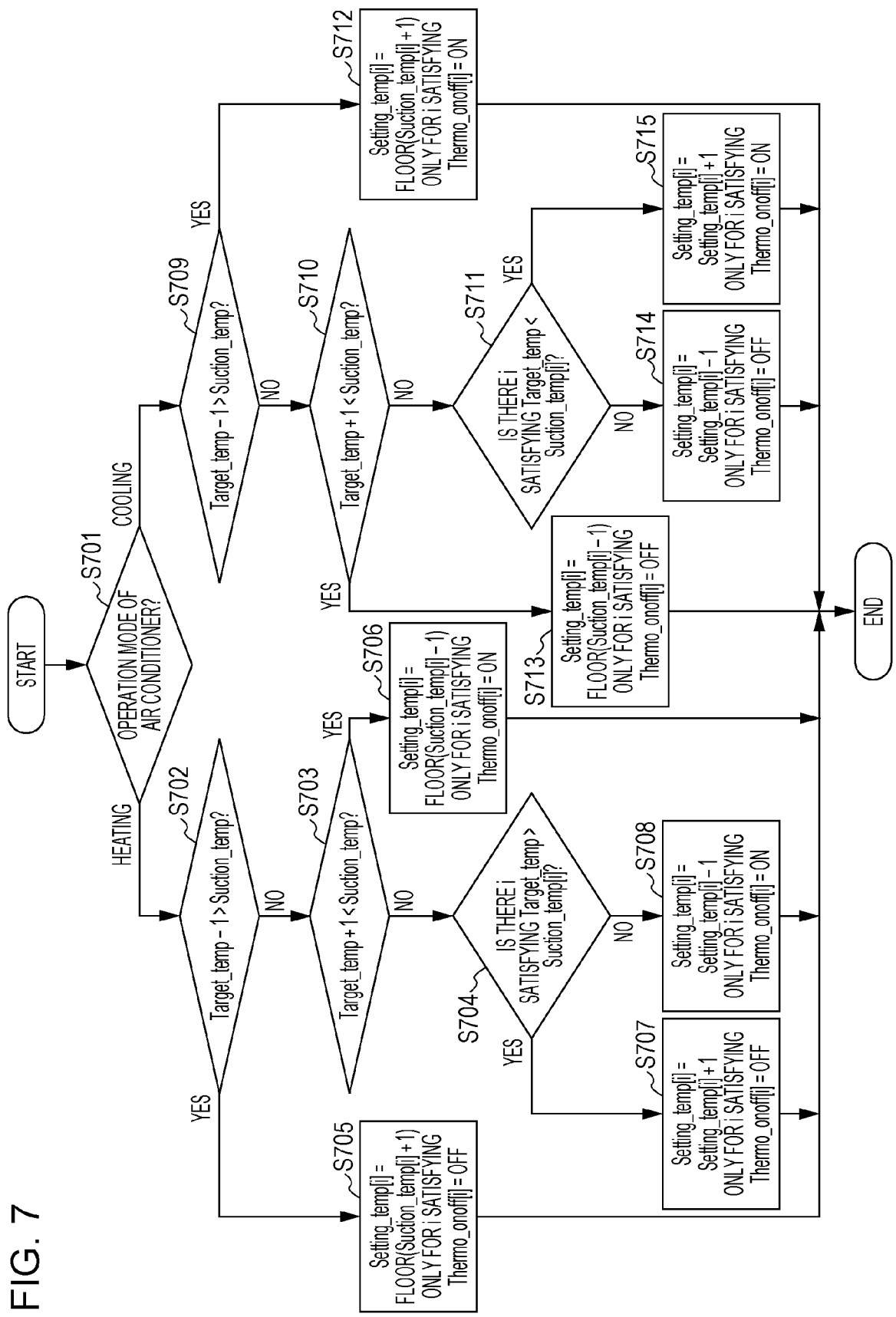
FIG. 7 is a flowchart depicting an operation of the controller according to a fourth embodiment.

FIG. 7 is a flowchart depicting an operation of the controller 106 according to the fourth embodiment. First, in step S701, the controller 106 determines the operation modes of the air conditioners 102-1, . . . , 102-$n$. In one example, the controller 106 proceeds to step S702 in the case where the number of air conditioners carrying out the heating operations is greater than the number of air conditioners carrying out the cooling operations from among the air conditioners 102-1, . . . , 102-$n$ on the basis of the operation modes received by the receiver 105, and proceeds to step S709 if that is not the case.

In the case where the operation of the controller 106 has proceeded to step S702, in step S702, the controller 106 carries out a determination relating to the target temperature and the average suction temperature value. In one example, the controller 106 obtains the average suction temperature value Suction_ave in accordance with the aforementioned numerical expression (3) using the suction temperatures Suction_temp[i] (1≤i≤n) of all of the air conditioners.

Next, the controller 106 carries out a comparison between the average suction temperature value Suction_ave and the target temperature Target_temp. In the case where Target_temp−1>Suction_ave is satisfied, the operation proceeds to step S705. However, in the case where Target_temp−1>Suction_ave is not satisfied, the operation proceeds to step S703.

In the case where the operation of the controller 106 has proceeded to step S703, in step S703, the controller 106 carries out a determination relating to the target temperature and the average suction temperature value. In one example, the controller 106 carries out a comparison between the average suction temperature value Suction_ave and the target temperature Target_temp. In the case where Target_temp+1<Suction_ave is satisfied, the operation proceeds to step S706. However, in the case where Target_temp+1<Suction_ave is not satisfied, the operation proceeds to step S704.

In the case where the operation of the controller 106 has proceeded to step S704, in step S704, the controller 106 carries out a determination relating to the target temperature and the suction temperatures. In one example, a comparison is carried out between the suction temperatures Suction_temp[i] (1≤i≤n) of all of the air conditioners and the target temperature Target_temp, the operation proceeds to step S707 in the case where there is i satisfying Target_temp>Suction_temp[i], and the operation proceeds to step S708 in the case where there is no i satisfying Target_temp>Suction_temp[i].

In the case where the operation of the controller 106 has proceeded to step S705, in step S705, the controller 106 decides the setting temperatures to be set for all of the air conditioners 102-1, . . . , 102-$n$, and outputs the decided setting temperatures as setting content to the transmitter 107.

In one example, the setting temperatures Setting_temp[i] (1≤i≤n) are decided using the aforementioned numerical expression (1) only for air conditioners in which the value of the thermo on/off state Thermo_onoff[i] (1≤i≤n) is thermo off (Thermo_onoff[i]=OFF) from among all of the air conditioners 102-1, . . . , 102-$n$, and the decided setting temperatures Setting_temp[i] (1≤i≤n) are output as setting content to the transmitter 107.

In another example, in the case where Target_temp>FLOOR(Suction_temp[i]+1) is established, the target temperature may be decided as the setting temperatures using numerical expression (1') instead of numerical expression (1).

Meanwhile, in the case where the operation of the controller 106 has proceeded to step S706, in step S706, the controller 106 decides the setting temperatures to be set for all of the air conditioners 102-1, . . . , 102-$n$, and outputs the decided setting temperatures as setting content to the transmitter 107.

In one example, the setting temperatures Setting_temp[i] (1≤i≤n) are decided using the aforementioned numerical expression (2) only for air conditioners in which the value of the thermo on/off state Thermo_onoff[i] (1≤i≤n) is thermo on (Thermo_onoff[i]=ON) from among all of the air conditioners 102-1, . . . , 102-$n$, and the decided setting temperatures Setting_temp[i] (1≤i≤n) are output as setting content to the transmitter 107.

In the case where the operation of the controller 106 has proceeded to step S707, in step S707, the controller 106 decides the setting temperatures to be set for all of the air conditioners 102-1, . . . , 102-$n$, and outputs the decided setting temperatures as setting content to the transmitter 107.

In one example, the setting temperatures Setting_temp[i] (1≤i≤n) are decided using the following numerical expression (4) only for air conditioners in which the value of the thermo on/off state Thermo_onoff[i] (1≤i≤n) is thermo off (Thermo_onoff[i]=OFF) from among all of the air conditioners 102-1, . . . , 102-$n$, and the decided setting temperatures Setting_temp[i] (1≤i≤n) are output as setting content to the transmitter 107.

$$\text{Setting\_temp}[i]=\text{Setting\_temp}[i]+1 \qquad (4)$$

Meanwhile, in the case where the operation of the controller 106 has proceeded to step S708, in step S708, the controller 106 decides the setting temperatures to be set for all of the air conditioners 102-1, . . . , 102-*n*, and outputs the decided setting temperatures as setting content to the transmitter 107.

In one example, the setting temperatures Setting_temp[i] (1≤i≤n) are decided using the following numerical expression (5) only for air conditioners in which the value of the thermo on/off state Thermo_onoff[i] (1≤i≤n) is thermo on (Thermo_onoff[i]=ON) from among all of the air conditioners 102-1, . . . , 102-*n*, and the decided setting temperatures Setting_temp[i] (1≤i≤n) are output as setting content to the transmitter 107.

$$Setting\_temp[i]=Setting\_temp[i]-1 \quad (5)$$

Meanwhile, in the case where the operation of the controller 106 has proceeded to step S709, in step S709, the controller 106 carries out a determination relating to the target temperature and the average suction temperature value. In one example, the controller 106 obtains the average suction temperature value Suction_ave in accordance with the aforementioned numerical expression (3) using the suction temperatures Suction_temp[i] (1≤i≤n) of all of the air conditioners.

Next, the controller 106 carries out a comparison between the average suction temperature value Suction_ave and the target temperature Target_temp. In the case where Target_temp−1>Suction_ave is satisfied, the operation proceeds to step S712. However, in the case where Target_temp−1>Suction_ave is not satisfied, the operation proceeds to step S710.

In the case where the operation of the controller 106 has proceeded to step S710, in step S710, the controller 106 carries out a comparison between the average suction temperature value Suction_ave and the target temperature Target_temp. In the case where Target_temp+1<Suction_ave is satisfied, the operation proceeds to step S713. However, in the case where Target_temp+1<Suction_ave is not satisfied, the operation proceeds to step S711.

In the case where the operation of the controller 106 has proceeded to step S711, in step S711, the controller 106 carries out a determination relating to the target temperature and the suction temperatures. In one example, a comparison is carried out between the suction temperatures Suction_temp[i] (1≤i≤n) of all of the air conditioners and the target temperature Target_temp, the operation proceeds to step S715 in the case where there is i satisfying Target_temp<Suction_temp[i], and the operation proceeds to step S714 in the case where there is no i satisfying Target_temp<Suction_temp[i].

Meanwhile, in the case where the operation of the controller 106 has proceeded to step S712, in step S712, the controller 106 decides the setting temperatures to be set for all of the air conditioners 102-1, . . . , 102-*n*, and outputs the decided setting temperatures as setting content to the transmitter 107.

In one example, the setting temperatures Setting_temp[i] (1≤i≤n) are decided using the aforementioned numerical expression (1) only for air conditioners in which the value of the thermo on/off state Thermo_onoff[i] (1≤i≤n) is thermo on (Thermo_onoff[i]=ON) from among all of the air conditioners 102-1, . . . , 102-*n*, and the decided setting temperatures Setting_temp[i] (1≤i≤n) are output as setting content to the transmitter 107.

Meanwhile, in the case where the operation of the controller 106 has proceeded to step S713, in step S713, the controller 106 decides the setting temperatures to be set for all of the air conditioners 102-1, . . . , 102-*n*, and outputs the decided setting temperatures as setting content to the transmitter 107.

In one example, the setting temperatures Setting_temp[i] (1≤i≤n) are decided using the aforementioned numerical expression (2) only for air conditioners in which the value of the thermo on/off state Thermo_onoff[i] (1≤i≤n) is thermo off (Thermo_onoff[i]=OFF) from among all of the air conditioners 102-1, . . . , 102-*n*, and the decided setting temperatures Setting_temp[i] (1≤i≤n) are output as setting content to the transmitter 107.

In another example, in the case where Target_temp<FLOOR(Suction_temp[i]−1) is established, the target temperature may be decided as the setting temperatures using numerical expression (2') instead of numerical expression (2).

In the case where the operation of the controller 106 has proceeded to step S714, in step S714, the controller 106 decides the setting temperatures to be set for all of the air conditioners 102-1, . . . , 102-*n*, and outputs the decided setting temperatures as setting content to the transmitter 107.

In one example, the setting temperatures Setting_temp[i] (1≤i≤n) are decided using the aforementioned numerical expression (5) only for air conditioners in which the value of the thermo on/off state Thermo_onoff[i] (1≤i≤n) is thermo off (Thermo_onoff[i]=OFF) from among all of the air conditioners 102-1, . . . , 102-*n*, and the decided setting temperatures Setting_temp[i] (1≤i≤n) are output as setting content to the transmitter 107.

Meanwhile, in the case where the operation of the controller 106 has proceeded to step S715, in step S715, the controller 106 decides the setting temperatures to be set for all of the air conditioners 102-1, . . . , 102-*n*, and outputs the decided setting temperatures as setting content to the transmitter 107.

In one example, the setting temperatures Setting_temp[i] (1≤i≤n) are decided using the aforementioned numerical expression (5) only for air conditioners in which the value of the thermo on/off state Thermo_onoff[i] (1≤i≤n) is thermo on (Thermo_onoff[i]=ON) from among all of the air conditioners 102-1, . . . , 102-*n*, and the decided setting temperatures Setting_temp[i] (1≤i≤n) are output as setting content to the transmitter 107.

In this way, according to the fourth embodiment, the operating efficiency (COP) of all of the air conditioners 102-1, . . . , 102-*n* can be improved by setting the setting temperatures of the air conditioners 102-1, . . . , 102-*n* using the target temperature that is input by way of the input device 104, the suction temperatures measured by the air conditioners 102-1, . . . , 102-*n*, and the operation modes and the thermo on/off states of the air conditioners 102-1, . . . , 102-*n*.

Furthermore, the operation data used by the air conditioner control device 103 is constituted by only the suction temperatures, the operation modes, and the thermo on/off states of the air conditioners 102-1, . . . , 102-*n*. In addition, the content by which the air conditioner control device 103 controls the air conditioners 102-1, . . . , 102-*n* is also constituted by only the setting of the setting temperatures. In this way, according to the fourth embodiment, only operation data and setting items that are within the framework of known air conditioners are used, and it is therefore not necessary for costs such as the addition of new functions to be incurred, and an improvement in operating efficiency can be easily achieved.

In addition, according to the fourth embodiment, the setting temperatures can be changed by 1° C. at a time. Thus, the setting temperatures are no longer subjected to large changes all at once, and sudden temperature changes can be avoided.

Fifth Embodiment

Next, an operation of the controller 106 according to a fifth embodiment of the present disclosure will be described. In the fifth embodiment, the controller 106 sets capacity limit values such that differences of the measurement values for suction temperature of the air conditioners 102-1, ..., 102-n from the target control value, and the magnitudes of the capacity limit values of the air conditioners 102-1, ..., 102-n have a positive correlation and a negative correlation during the cooling operations and during the heating operations, respectively. An example of setting such capacity limit values will be described later on with reference to FIG. 8.

Here, the capacity limit values mean parameters for limiting the capacities of the air conditioners 102-1, ..., 102-n. For example, if the capacity limit values are 100 (%), the air conditioners 102-1, ..., 102-n can operate at full rated capacity. For example, if the capacity limit values are 50 (%), the air conditioners 102-1, ..., 102-n can only demonstrate up to half the rated capacity at most.

The capacity limit value is sometimes referred to as a "demand value", and a value obtained by "100—capacity limit value" is sometimes referred to as a "cut value".

Here, the fifth embodiment is described taking, as an example, a case in which the controller 106 decides setting content to be set for the air conditioners 102-1, ..., 102-n, using the target temperature (Target_temp), the suction temperatures (Suction_temp[i] (1≤i≤n)) of the air conditioners 102-1, ..., 102-n, the operation modes of the air conditioners 102-1, ..., 102-n, and the thermo on/off states (Thermo_onoff[i] (1≤i≤n)) of the air conditioners 102-1, ..., 102-n, received by the receiver 105.

In embodiment 5, the setting content includes the setting temperatures (Setting_temp[i] (1≤i≤n)) and the capacity limit values (Demand[i] (1≤i≤n)).

Figure 8:
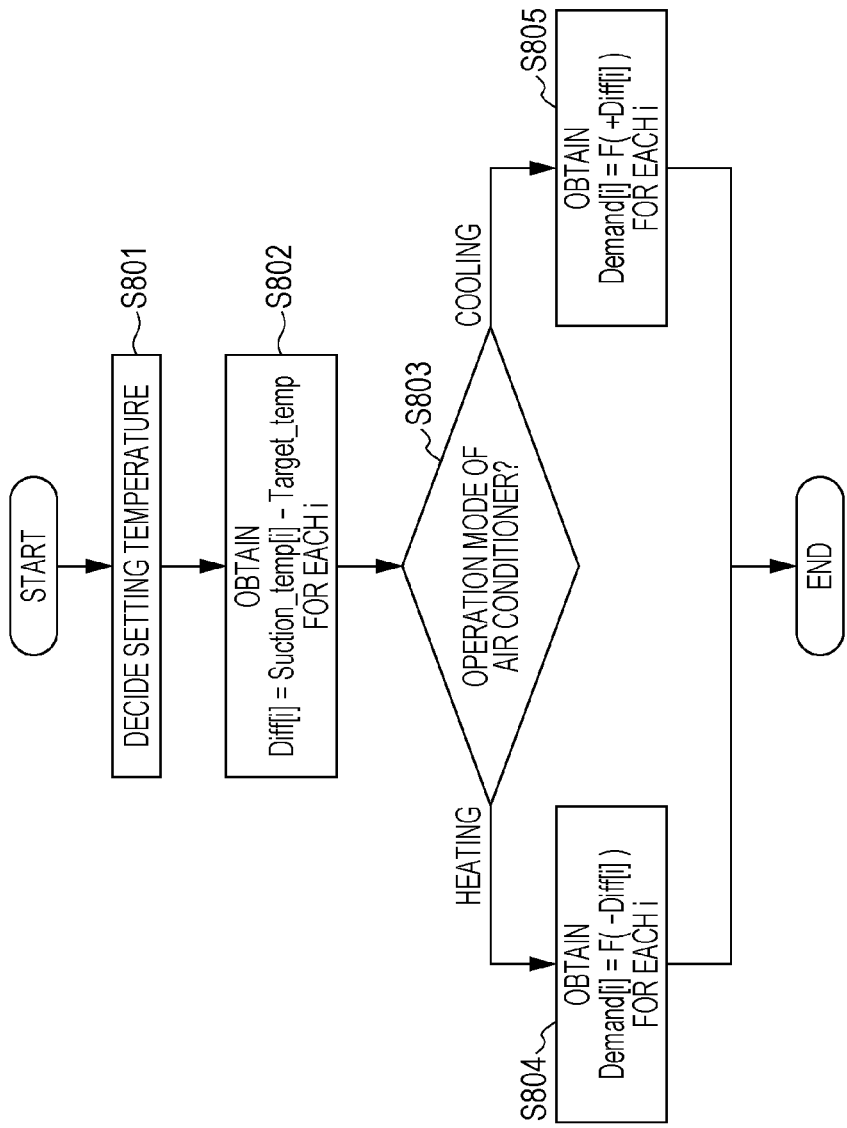
FIG. 8 is a flowchart depicting an operation of the controller according to a fifth embodiment.

FIG. 8 is a flowchart depicting an operation of the controller 106 according to the fifth embodiment. First, in step S801, the controller 106 decides the setting temperatures to be set for the air conditioners 102-1, ..., 102-n. In one example, the controller 106 decides the setting temperatures to be set for the air conditioners 102-1, ..., 102-n, in accordance with a flowchart depicted in any of FIGS. 2, 5, 6, and 7.

Next, in step S802, the controller 106 obtains the differences Diff[i] (1≤i≤n) between the suction temperatures Suction_temp[i] (1≤i≤n) of the air conditioners 102-1, ..., 102-n and the target temperature Target_temp, in accordance with the following numerical expression (6).

$$\text{Diff}[i]=\text{Suction\_temp}[i]-\text{Target\_temp} \qquad (6)$$

Next, in step S803, the controller 106 determines the operation modes of the air conditioners 102-1, ..., 102-n. In one example, the controller 106 proceeds to step S804 in the case where the number of air conditioners carrying out the heating operations is greater than the number of air conditioners carrying out the cooling operations from among the air conditioners 102-1, ..., 102-n on the basis of the operation modes received by the receiver 105, and proceeds to step S805 if that is not the case.

In the case where the operation of the controller 106 has proceeded to step S804, in step S804, the controller 106 decides the capacity limit values Demand[i] (1≤i≤n) in accordance with the following numerical expression (7).

$$\text{Demand}[i]=F(-\text{Diff}[i]) \qquad (7)$$

Figure 9:
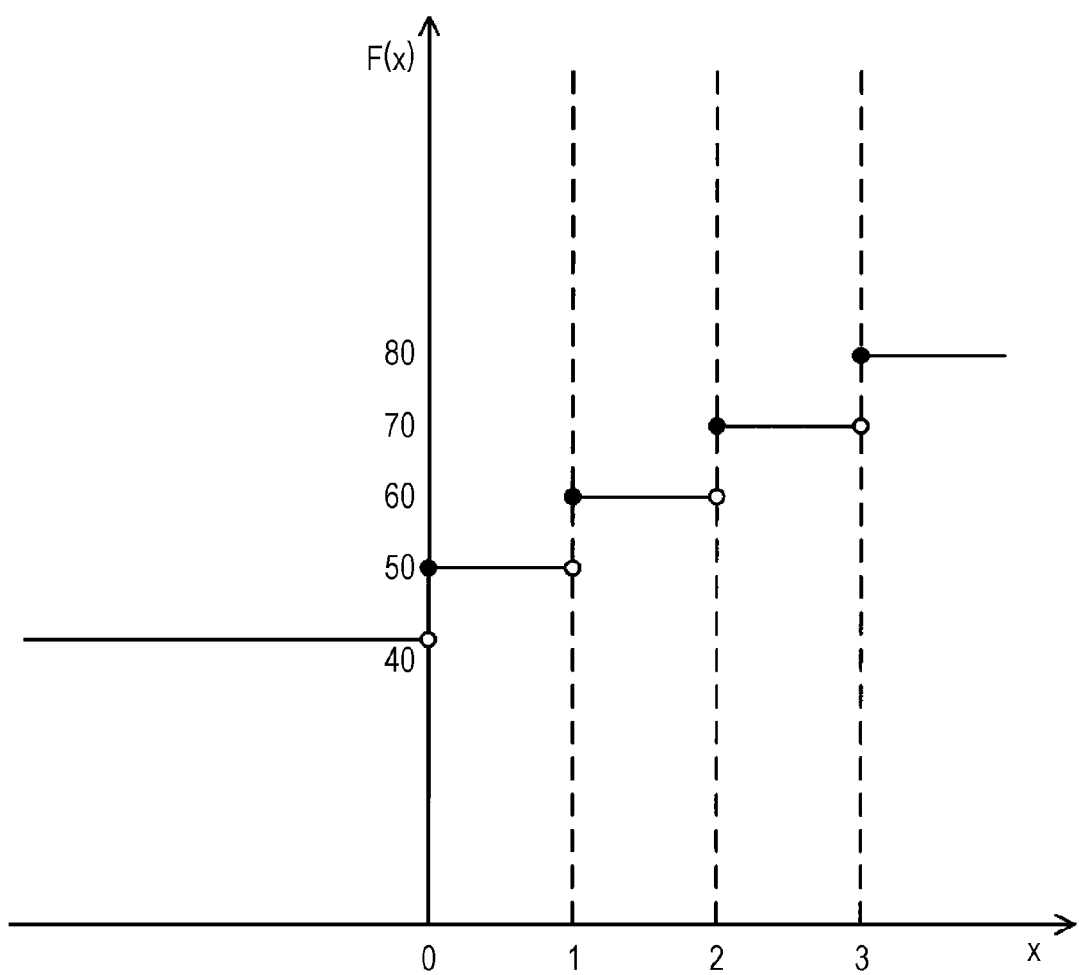
FIG. 9 is a graph of an example of a function indicating a relationship between difference values and capacity limit values according to the fifth embodiment.

FIG. 9 is a graph of an example of a function $F(x)$ indicating a relationship between difference values and capacity limit values according to the fifth embodiment. In one example, the function $F(x)$ is a monotonically increasing function in which a value increases when the value of x increases. For example, the function $F(x)$ depicted in FIG. 9 is defined according to the following numerical expression (8).

$$F(x) = \begin{cases} 40 & (x < 0) \\ 50 & (0 \le x < 1) \\ 60 & (1 \le x < 2) \\ 70 & (2 \le x < 3) \\ 80 & (3 \le x) \end{cases} \qquad (8)$$

Reference will once again be made to FIG. 8. In the case where the operation of the controller 106 has proceeded to step S805, in step S805, the controller 106 decides the capacity limit values Demand[i] (1≤i≤n) in accordance with the following numerical expression (9).

$$\text{Demand}[i]=F(+\text{Diff}[i]) \qquad (9)$$

In step S804 or S805, the controller 106 decides the capacity limit values Demand[i] for every i. Next, the controller 106 outputs the decided capacity limit values Demand[i] as setting content to the transmitter 107.

By selecting the function $F(x)$ which is a monotonically increasing function, the differences of the measurement values for suction temperature of the air conditioners 102-1, ..., 102-n from the target control value, and the magnitudes of the capacity limit values of the air conditioners 102-1, ..., 102-n have a positive correlation (or a negative correlation) during the cooling operations (or the heating operations).

In one example, the operation to decide the setting temperatures and the operation to decide the capacity limit values are implemented together as a series of operations by the controller 106. In one example, the controller 106 carries out the series of operations at each fixed period. Each fixed period is 5 to 10 minutes, for example.

According to the fifth embodiment, the controller 106 obtains the differences between the suction temperatures and the target temperature, and determines whether or not the air conditioners 102-1, ..., 102-n are air conditioners that are to actively carry out cooling (or heating). Next, in the case where there are air conditioners that are to actively carry out cooling (or heating), the controller 106 changes the capacity limit values to large values for cooling (or heating) to be actively carried out. Furthermore, in the case where there are air conditioners that are not to actively carry out cooling (or heating), the controller 106 changes the capacity limit values to small values for cooling (or heating) to be carried out in a comparatively moderate manner. Thus, it is possible for consideration to be given such that a specific place inside the area 101 does not become excessively cold (or excessively hot), while conserving energy.

Embodiments of the present disclosure have been described hereinabove. The air conditioning system 100 according to the present disclosure is able to obtain a favorable performance in the control of air conditioners that perform air conditioning in the same area 101. Furthermore, the air conditioner control device 103 according to the present disclosure can also be mounted in an equipment control device in an energy management system. In this case also, an equipment control device having an action and effect similar to the action and effect described in the present disclosure can be provided.

Figure 10:
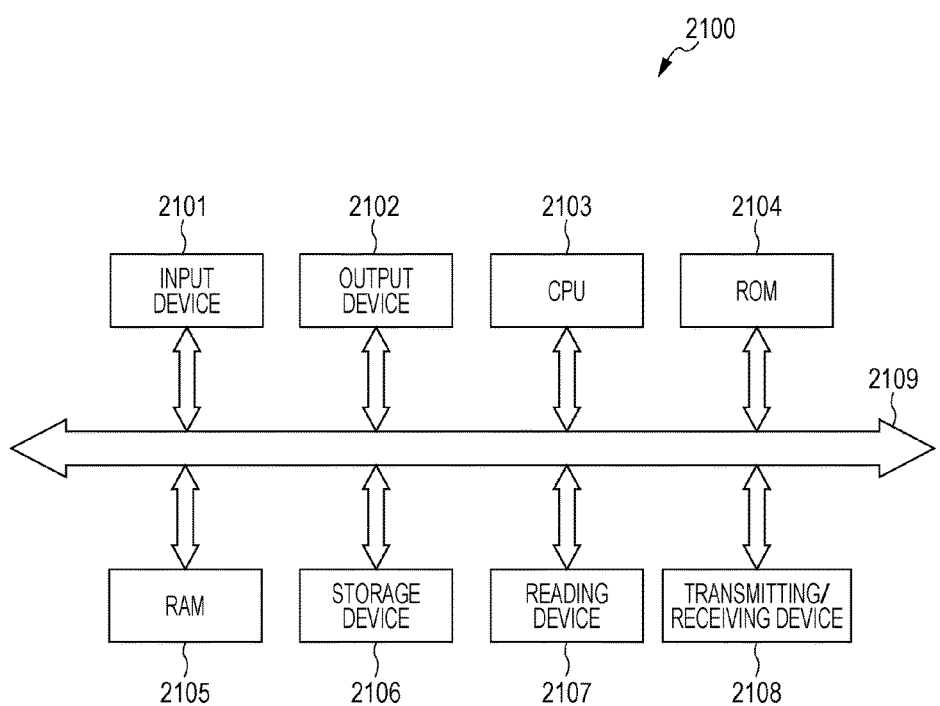
FIG. 10 is a drawing depicting an example of a hardware configuration of a computer.

FIG. 10 is a drawing depicting an example of a hardware configuration of a computer. The functions of the parts in the aforementioned embodiments are realized by a program executed by a computer 2100.

As depicted in FIG. 10, the computer 2100 includes an input device 2101 such as an input button or a touch pad, an output device 2102 such as a display or a speaker, a central processing unit (CPU) 2103, a read-only memory (ROM) 2104, and a random-access memory (RAM) 2105. Furthermore, the computer 2100 includes a storage device 2106 such as a hard disk device or a solid-state drive (SSD), a reading device 2107 that reads information from a recording medium such as a digital versatile disc read-only memory (DVD-ROM) or a Universal Serial Bus (USB) memory, and a transmitting/receiving device 2108 that performs communication via a network. The aforementioned parts are connected by a bus 2109.

The reading device 2107 reads a program for realizing the functions of the aforementioned parts from a recording medium on which the program is recorded, and stores the program in the storage device 2106. Alternatively, the transmitting/receiving device 2108 communicates with a server device connected to the network, and stores, in the storage device 2106, a program for realizing the functions of the aforementioned parts downloaded from the server device.

The CPU 2103 then copies the program stored in the storage device 2106 to the RAM 2105, and sequentially reads out and executes commands included in the program from the RAM 2105, thereby realizing the functions of the aforementioned parts. Furthermore, when the program is executed, the information obtained by the various processing described in the embodiments is stored in the RAM 2105 or the storage device 2106 and is used as appropriate.

Other Embodiments

The air conditioning system 100 and method according to the present disclosure are not restricted to the aforementioned embodiments, and it is possible for various alterations to be implemented.

In the present disclosure, a description has been given taking, as an example, the case where the present disclosure is configured by means of hardware. Alternately, it is also possible for the present disclosure to be realized by means of software. For example, it is possible for an algorithm for the air conditioner control method according to the present disclosure to be described using a programming language, and this program to be stored in a memory and executed by an information processing means, thereby realizing functions similar to those of the air conditioning system 100 according to the present disclosure.

Furthermore, each function block used in the description of the aforementioned embodiments is typically realized as an LSI, which is an integrated circuit. These may be implemented separately as single chips or may be implemented as a single chip in such a way as to include some or all of the functional blocks. An LSI is an example of an integrated circuit, and an integrated circuit may be referred to as an IC, a system LSI, a super LSI, an ultra LSI, or the like depending on the difference in the degree of integration.

Furthermore, the technique for circuit integration is not restricted to an LSI and may be realized using a dedicated circuit or a general-purpose processor. After an LSI has been manufactured, a field-programmable gate array (FPGA) that can be programmed, or a reconfigurable processor with which the connections or settings of circuits cells inside the LSI can be reconfigured, may be used.

In addition, if circuit integration technology that replaces LSI appears as a result of another technology that is an advancement in semiconductor technology or is derived therefrom, naturally, the other technology may be used to carry out the integration of functional blocks. The application and the like of biotechnology is also a possibility.

The air conditioner control device, the air conditioner control method, and the like according to the present disclosure can be applied in a use for energy conservation in an energy management system.

What is claimed is:

1. An air conditioner control device, comprising:
a receiver that receives measurement values for ambient temperatures of air conditioners installed inside a facility; and
a controller that adjusts setting temperatures for cooling operations of each of the air conditioners to values that are less than the measurement values for each of the air conditioners, when at least one of the measurement values received by the receiver is greater than a target temperature inside the facility,
wherein the controller adjusts the setting temperatures for the cooling operations of the air conditioners for which the measurement values are greater than the target temperature, to the target temperature, and adjusts the setting temperatures for the cooling operations of the air conditioners for which the measurement values are less than the target temperature, to values that are less than the measurement values for each of the air conditioners.

2. The air conditioner control device according to claim 1, wherein the controller adjusts the setting temperatures to values that are less than the measurement values for each of the air conditioners, the setting temperatures for the cooling operations of the air conditioners for which the measurement values are greater than the target temperature being adjusted to be lower than the setting temperatures for the cooling operations of the air conditioners for which the measurement values are less than the target temperature.

3. The air conditioner control device according to claim 1, wherein the controller causes all of the air conditioners to execute the cooling operations when an average value for the measurement values for each of the air conditioners is greater than the target temperature by a predetermined value or more.

4. The air conditioner control device according to claim 1, wherein the controller adjusts, in stages, the setting temperatures for the cooling operations to values that are less than the measurement values.

5. The air conditioner control device according to claim 1, wherein the controller limits capacities of the air conditioners such that differences of the measurement values from the target temperature and magnitudes of capacity limits of the air conditioners have a positive correlation.

6. The air conditioner control device according to claim 1, wherein the controller adjusts the setting temperatures for the cooling operations of each of the air conditioners to values that are greater than the measurement values, when the measurement values for each of the air conditioners are all less than the target temperature.

7. The air conditioner control device according to claim 1, wherein the controller causes all of the air conditioners to stop the cooling operations when an average value for the measurement values for each of the air conditioners is less than the target temperature by a predetermined value or more.

8. The air conditioner control device according to claim 1, wherein the ambient temperatures of the air conditioners are suction port temperatures of the air conditioners.

9. An air conditioner control device, comprising:
a receiver that receives measurement values for ambient temperatures of air conditioners installed inside a facility; and
a controller that adjusts setting temperatures for heating operations of each of the air conditioners to values that are greater than the measurement values for each of the air conditioners, when at least one of the measurement values received by the receiver is less than a target temperature inside the facility,
wherein the controller adjusts the setting temperatures for the heating operations of the air conditioners for which the measurement values are less than the target temperature, to the target temperature, and adjusts the setting temperatures for the heating operations of the air conditioners for which the measurement values are greater than the target temperature, to values that are greater than the measurement values for each of the air conditioners.

10. The air conditioner control device according to claim 9, wherein the controller adjusts the setting temperatures to values that are greater than the measurement values for each of the air conditioners, the setting temperatures for the heating operations of the air conditioners for which the measurement values are less than the target temperature being adjusted to be higher than the setting temperatures for the heating operations of the air conditioners for which the measurement values are greater than the target temperature.

11. The air conditioner control device according to claim 9, wherein the controller causes all of the air conditioners to execute the heating operations when an average value for the measurement values for each of the air conditioners is less than the target temperature by a predetermined value or more.

12. The air conditioner control device according to claim 9, wherein the controller adjusts, in stages, the setting temperatures for the heating operations to values that are greater than the measurement values.

13. The air conditioner control device according to claim 9, wherein the controller limits capacities of the air conditioners such that differences of the measurement values from the target temperature and magnitudes of capacity limits of the air conditioners have a negative correlation.

14. The air conditioner control device according to claim 9, wherein the controller adjusts the setting temperatures for the heating operations of each of the air conditioners to values that are less than the measurement values, when the measurement values for each of the air conditioners are all greater than the target temperature.

15. The air conditioner control device according to claim 9, wherein the controller causes all of the air conditioners to stop the heating operations when an average value for the measurement values for each of the air conditioners is greater than the target temperature by a predetermined value or more.

16. The air conditioner control device according to claim 9, wherein the ambient temperatures of the air conditioners are suction port temperatures of the air conditioners.

17. An air conditioner control method comprising:
receiving measurement values for ambient temperatures of air conditioners installed inside a facility;
determining that at least one of the measurement values received by a receiver is greater than a target temperature inside the facility; and
adjusting setting temperatures for cooling operations of each of the air conditioners to values that are less than the measurement values for each of the air conditioners responsive to the determining that the at least one of the measurement values received by the receiver is greater than the target temperature inside the facility,
wherein the adjusting adjusts the setting temperatures for the cooling operations of the air conditioners for which the measurement values are greater than the target temperature, to the target temperature, and adjusts the setting temperatures for the cooling operations of the air conditioners for which the measurement values are less than the target temperature, to values that are less than the measurement values for each of the air conditioners.

18. An air conditioner control method comprising:
receiving measurement values for ambient temperatures of air conditioners installed inside a facility;
determining that at least one of the measurement values received by a receiver is less than a target temperature inside the facility; and
adjusting setting temperatures for heating operations of each of the air conditioners to values that are greater than the measurement values for each of the air conditioners responsive to the determining that the at least one of the measurement values received by the receiver is less than the target temperature inside the facility,
wherein the adjusting adjusts the setting temperatures for the heating operations of the air conditioners for which the measurement values are less than the target temperature, to the target temperature, and adjusts the setting temperatures for the heating operations of the air conditioners for which the measurement values are greater than the target temperature, to values that are greater than the measurement values for each of the air conditioners.

* * * * *